United States Patent [19]
Haghiri-Tehrani

[11] Patent Number: 5,531,145
[45] Date of Patent: Jul. 2, 1996

[54] METHOD FOR MAKING IC CARD HAVING SEVERABLE MINI CHIP CARD

[75] Inventor: Yahya Haghiri-Tehrani, Munich, Germany

[73] Assignee: GAO Gesellschaft fur Automation und Organisation mbH, Germany

[21] Appl. No.: 289,191

[22] Filed: Aug. 11, 1994

Related U.S. Application Data

[62] Division of Ser. No. 200,584, Feb. 22, 1994, Pat. No. 5,362,955, which is a continuation of Ser. No. 665,023, Mar. 5, 1991, abandoned.

[30] Foreign Application Priority Data

Mar. 7, 1990 [DE] Germany ................... 40 07 221.5

[51] Int. Cl.⁶ ........................................ B26D 5/32
[52] U.S. Cl. ................. 83/27; 83/41; 83/55; 83/367; 83/371
[58] Field of Search .................... 83/13, 27, 34, 83/40, 55, 76.8, 370, 371, 945, 41, 209, 211, 364, 367; 235/492

[56] References Cited

U.S. PATENT DOCUMENTS

| | | | |
|---|---|---|---|
| 4,443,027 | 4/1984 | McNeely et al. | 283/83 |
| 4,555,968 | 12/1985 | Raney et al. | 83/209 |
| 4,639,585 | 1/1987 | Haghiri-Tehrani | 235/492 |
| 4,822,988 | 4/1989 | Gloton | 235/492 |
| 4,897,534 | 1/1990 | Haghiri-Tehrani | 235/488 |
| 4,963,822 | 10/1990 | Prokopp | 324/758 |
| 5,031,026 | 7/1991 | Ueda | 257/679 |
| 5,049,728 | 9/1991 | Rovin | 235/492 |
| 5,362,955 | 11/1994 | Haghiri-Tehrani | 235/492 |

FOREIGN PATENT DOCUMENTS

| | | |
|---|---|---|
| 0344654 | 12/1989 | European Pat. Off. . |
| 0355273 | 2/1990 | European Pat. Off. . |
| 402182 | 12/1990 | European Pat. Off. . |
| 3204032 | 8/1983 | Germany ........................... 83/27 |
| 3420051 | 12/1985 | Germany . |
| 3639630 | 6/1988 | Germany . |
| 3804361 | 9/1988 | Germany . |
| 0075986 | 4/1986 | Japan . |
| 8802744 | 6/1990 | Netherlands . |
| 958946 | 5/1964 | United Kingdom . |

*Primary Examiner*—Rinaldi I. Rada
*Assistant Examiner*—Raymond D. Woods
*Attorney, Agent, or Firm*—Andrus Sceales Starke and Sawall

[57] ABSTRACT

A method for producing a mini chip card out of a standard card having an embedded semiconductor chip uses a punching die with cutting edges defining the outer contour of the mini chip card. The punching die is adjusted relative to the standard card and with respect to contact surfaces of the embedded semiconductor chip so that the edges of the punching die are at a predetermined distance from the contact surfaces. The punching of the standard card is performed in this adjusted position so that the contact surfaces are in a reference position with respect to the outer contour of the mini chip card. The punching forms the mini chip card in the correct position in the standard card. The mini chip card may initially remain connected to the standard card by thin bars between the cards.

4 Claims, 7 Drawing Sheets

METHOD FOR MAKING IC CARD HAVING SEVERABLE MINI CHIP CARD

CROSS REFERENCE TO RELATED APPLICATION

The present application is a divisional application of U.S. patent application Ser. No. 08/200,584, filed Feb. 22, 1994, now U.S. Pat. No. 5,362,955, which application is a continuation application of U.S. patent application Ser. No. 07/665,023, filed Mar. 5, 1991, now abandoned.

BACKGROUND OF THE INVENTION—FIELD OF THE INVENTION

The present invention relates to a method for producing so-called "mini chip cards," which are also referred to in the expert world as "plug-in SIMs," starting out from a check card according to the international standard, which is referred to in the expert world as an "IC card."

BACKGROUND OF THE INVENTION—DESCRIPTION OF THE PRIOR ART

The term "check cards" when used in the following will refer to cards having at least one semiconductor chip embedded therein. Such cards are known in diverse embodiments; they are intended to communicate with terminal units, such as money dispensers, vending machines, card telephones, access control units and the like, whereby the circuit integrated in the semiconductor chip is activated via electric contacts located in the terminal unit. Since terminal units from different manufacturers should be compatible with cards from different manufacturers, both the outer dimensions of such a check card and the size and position of the contact surfaces relative to the outer edges of such a check card have been standardized. The outer dimensions of the card are international standardized by the standard ISO 7810, and the size and position of the contact surfaces of the semiconductor chip by the standard ISO 7816/2.

When a check card is inserted into a terminal unit, stop means located in the device bring the outer edges of the card in a certain position into which the contacts on the unit side are in contact with the contact surfaces of the card. The contacting is only successful if the position of the contacts is within the tolerance window defined by the standard.

Such a card meeting the international standard ISO 7816/2 will be referred to in the following as a "standard card."

The check cards are normally punched out of multicopy sheets or strips, the punching dies being aligned with markings which in turn have a certain predefined position relative to the contact surfaces. Afterwards the outer edges of the punched cards must be positioned relative to the contact surfaces in such a way that the tolerance window defined by the standard for the contact surfaces is within the actually existing contact surfaces.

The precision of the punching dies used is coordinated with the available ranges of tolerance, so that it is not possible, for example, to repunch a standard card, once it is punched, using a reference edge of this card. In such a case the necessarily occurring positioning errors would overlap, in the most unfavorable case, and result in a value outside the acceptable extent of tolerance. A need therefore exists for an exact positioning of a multicopy sheet, strip or prepunched card starting out from the contact surfaces, or for detection of the actual position of the contact surfaces relative to a predetermined tolerance window. This localization or positioning should be performed by a device of simple and compact construction that works reliably and is easy to operate.

SUMMARY OF THE INVENTION

This problem is solved by a test head which works on the principle of galvanically scanning the limits or outer edges of the tolerance windows defined by the standard. The current flow is measured between a contact pin disposed in the middle of the tolerance window, for example, and contact pins disposed at the edge of the tolerance window defined by the standard.

Under certain conditions it may suffice to measure only one contact surface and to deduce the correct position of the other contact surfaces from the correct position of this contact surface. However, embodiments are preferred in which a plurality of contact surfaces are measured simultaneously in order to rule out angle offset errors. In the contact surface plan according to the standard ISO 7816/2 contacts C6 and C8 are preferably measured.

The test head has the advantage of being simple and robust, in particular compared with known optical localizing systems.

The test head can therefore be used particularly advantageously for the quality control of standard cards, i.e. for detecting the position of the contact surfaces of standard cards with respect to their agreement with the tolerance window defined by the standard. However, the test head can also be used for positioning cards or carriers having embedded semiconductor chips for processing, in particular punching. This problem arises particularly during the production of check cards that are very much smaller than the check cards whose outer dimensions meet the standard ISO 7810.

Current rapid developments in the relevant field, in particular the miniaturization of the terminal units, make it necessary to use check cards that are very much smaller than the standard cards customary up to now. In particular for mobile telephones, the so-called "mini chip card" has become accepted which is substantially smaller than a check card with international standardization of its outer dimensions, but whose contact surface plan meets that of the standard card.

In the current introductory phase of mini chip cards, the production means, and especially the personalization means, for check cards having embedded semiconductor chips are invariably oriented toward the standard format of ISO 7810, so that the substantially smaller mini chip cards cannot be personalized by conventional means. The various terminal units on the market furthermore require a stock keeping both of standard cards and of mini chip cards.

To solve these problems it would be advantageous if one could start out with a standard card and punch the mini chip card out of the standard card as the last production step. However, this is difficult because the mini chip card would have to be punched out using the outer edges of the standard card as reference edges. The outer edges of standard cards are already within a certain range of tolerance with respect to the position of the contact surfaces, so that in the most unfavorable case the punching tolerances would add up.

According to the invention, a carrier having an embedded semiconductor chip, or its contact surfaces, are therefore adjusted relative to a punching die using the above-described test head, i.e. the positioning does not start out from the outer edges. During the subsequent punching operation the outer edges of the standard card are punched and simultaneously the outer edges of the mini chip card—the latter not completely, but in such a way that the mini chip card remains connected with the standard card by small, easily severable bars. The bars are disposed so as to be seated at places on the outer edges of the mini card that will not be used as reference points for subsequently contacting the mini chip card. Two reference points on a longitudinal edge and one reference point on the shorter transverse edge are customarily selected for correctly positioning the standard card or the mini chip card in the terminal unit for contacting by the contacts on the unit side.

The semiconductor chip is loaded or personalized after punching using conventional means and devices, i.e. during this time the mini chip card is still connected with the standard card. If the end user does not require the standard card, but rather the mini chip card, this mini chip card is pressed out or punched out of the standard card by using a circular die to punch out the bar areas. Since the bar areas are located outside the reference points on the edges, it plays no part if the outer edges have a concave indentation, for example, after the bar area is punched away.

The described method is suitable in particular for punching mini chip cards out of prepunched standard cards. As already described, the standard cards cannot be positioned by stop means cooperating with the outer edges. One instead uses the test head to put the card in a reference position with respect to the contact surfaces. The second punching operation then takes place relative to the actual position of the contact surfaces and not to the actual position of the outer edges of the standard card, which may already be at the edge of a predetermined range of tolerance. The mini chip card need not be punched fully out of the standard card, but can remain connected with the standard card by two or more bars to be removed later. The card can therefore be used as a standard card with accordingly greater dimensions, or else the mini chip card can be separated from the standard card if required. The pressing or punching of the mini chip card out of the standard card is an irreversible process; the card cannot be subsequently reunited with the standard card.

A chip card is already known wherein the semiconductor chip is disposed on a plug-in part with substantially smaller dimensions than the standard card. However, the edge areas of the plug-in part and the cooperating edge areas of the standard card are designed so as to have locking means, so that the plug-in part can alternatively be used alone or connected with the standard card. This special profiling of the engaged edge areas necessitates a fully separate production of the plug-in part, on the one hand, and the standard card, on the other. This known chip card (German patent no. 38 04 361) therefore fails to achieve the effect aimed at by the invention, namely to produce a mini chip card starting out from a standard card.

Another chip card is known wherein the area of the card in which the semiconductor chip is located is separated from the remaining card area by a predetermined breaking line. The predetermined breaking line is intended to prevent stresses from being transmitted to the semiconductor chip when the card is twisted or bent during use. There is no possibility or intention of separating the area bearing the semiconductor chip and using this area as a mini chip card with definite standardized dimensions (German "offenlegungsschrift" no. 34 20 051).

The advantages of the invention over the above-mentioned prior art are in particular that the stock keeping in the sales organization can be reduced since the customer can alternatively be offered cards having the outer dimensions according to ISO 7510 or the mini chip cards. The mini chip cards can also be separated from the standard cards in the sales organization using extremely simple means. A further advantage is that the mini chip cards can be produced using conventional personalization and inscription devices since their format is only reduced in a last method step. All preceding processing steps, such as the inscription of the card and loading of the semiconductor chip with the user group or personal data, can take place using conventional means.

BRIEF DESCRIPTION OF THE DRAWING

In the following, embodiments of the invention shall be described by way of example with reference to the enclosed drawing, in which.

DETAILED DESCRIPTION OF THE PREFERRED EMBODIMENTS

Figure 1:
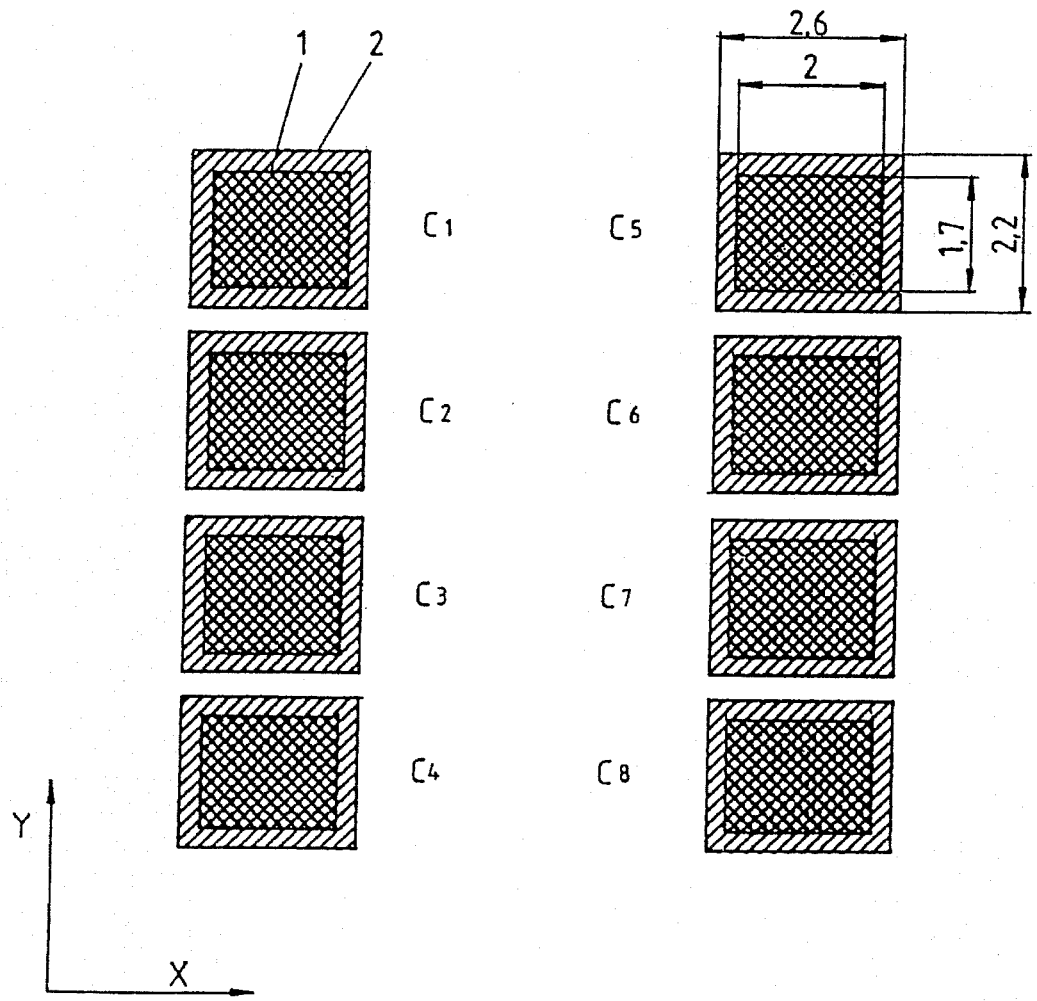
FIG. 1 shows the contact plan of a standard card according to ISO 7816/2.

FIG. 1 shows schematically and not true to scale the contact surface plan of a standard card with eight contacts disposed in two parallel rows. The contacts have the following functions: the operating voltage of customarily 5 volts is supplied via contact C1; contact C2 serves to feed a reset signal; a timing signal is fed via C3; C4 is reserved for future uses and is generally not connected with the semiconductor chip; C5 is on voltage 0; the programming voltage can be supplied in an order of magnitude of approx. 25 volts via C6; C7 is for data input and data output; and C8 is reserved for future applications.

In FIG. 1, reference number 1 marks the nominal contact surface (1.7×2.0 mm) according to the standard ISO 7816/2. Reference number 2 marks an example of the actual size of the contact surfaces (2.2×2.6 mm). Apart from the minimum size of the contact surfaces, the standard defines the contact surface banks with respect to their spacing from the outer edges of the card, since these outer edges serve as reference edges for a subsequent positioning of the card in the terminal unit. To compensate punching tolerances, the actual sizes of the contact surfaces are greater than the nominal sizes. In the case shown in FIG. 1 all nominal surfaces are disposed centrically relative to the actual surfaces, which would mean positioning tolerances of +−0. But in practice such a case would hardly occur. In the case shown, positioning tolerances of +−0.3 in the X direction and +−0.25 in the Y direction would be possible. In the borderline case, two edges of a nominal window would therefore be congruent with an actual contact surface. If a nominal area 1 protrudes beyond an actual area 2, this is an impermissible case that must be considered a reject.

The contact surfaces provided according to the standard are not present in every case; for example contact surfaces C4 and C8 intended for future uses are lacking in some embodiments. It is therefore advantageous to test in particular contacts C6 and C2, contact C6 because the programming voltage of 25 volts is frequently derived from the operating voltage (contact C1) and contact C6 is therefore not connected with the chip at all. When testing contact C6 there is therefore no danger of an undesirable current flow through the chip.

FIGS. 2a to d show various contact configurations that permit testing of contact surfaces.

Figure 2A:
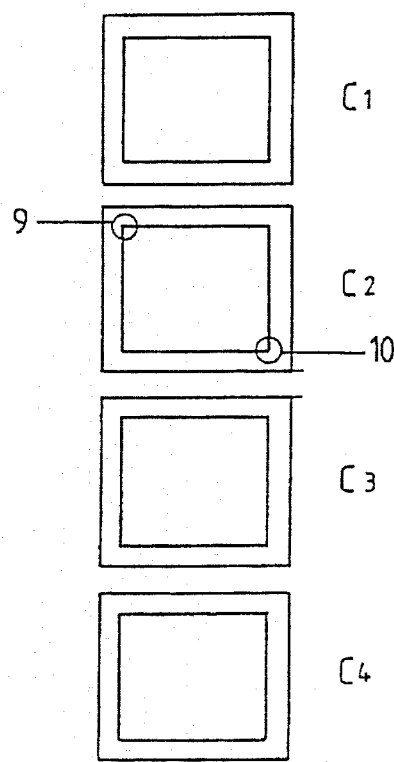
FIGS. 2a to 2d show arrangements of contact pins of a test head for detecting the position of the contact surfaces.
Figure 2A:
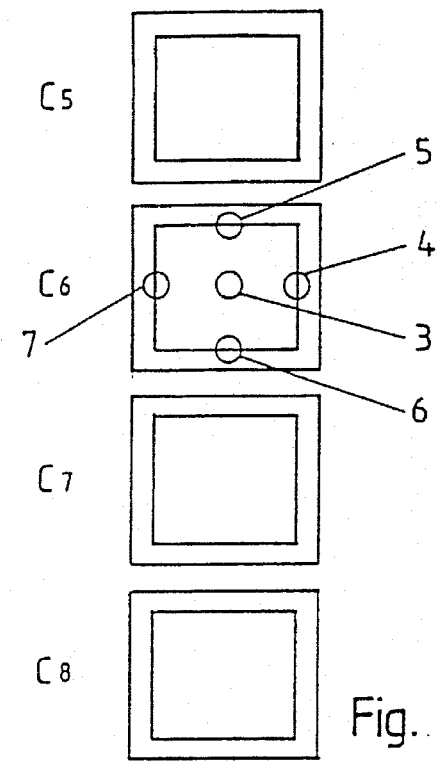
Figure 2B:
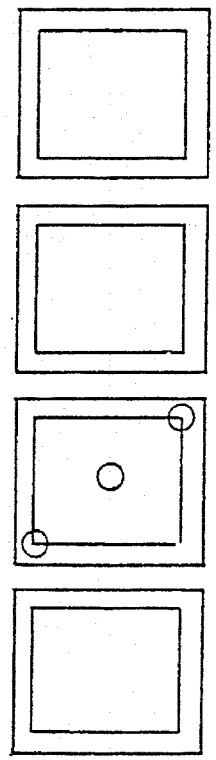
Figure 2B:
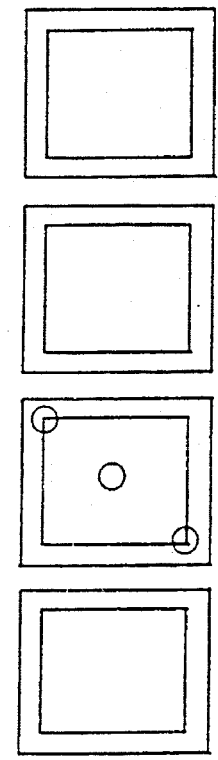
Figure 2C:
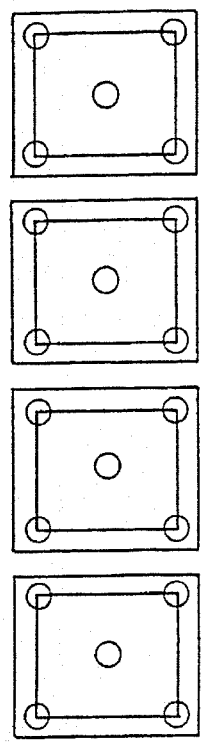
Figure 2C:
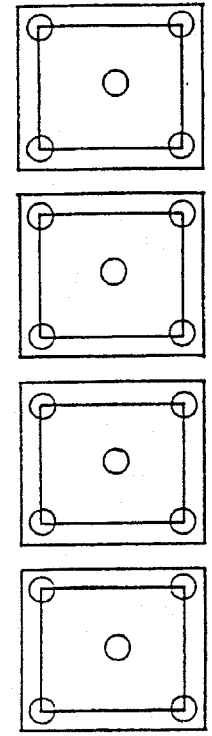
Figure 2D:
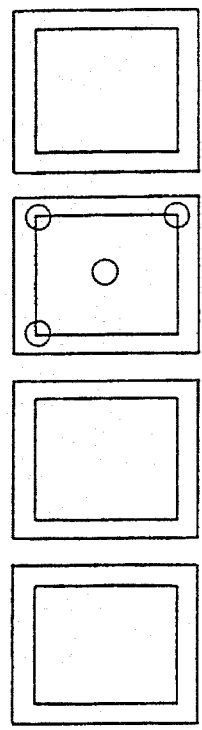
Figure 2D:
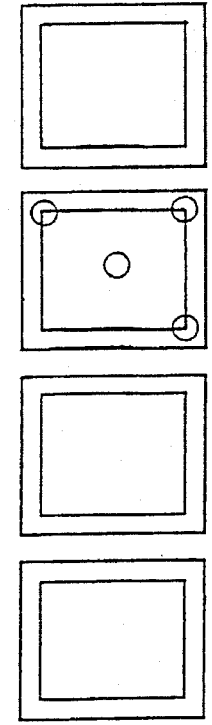
Figure 3:
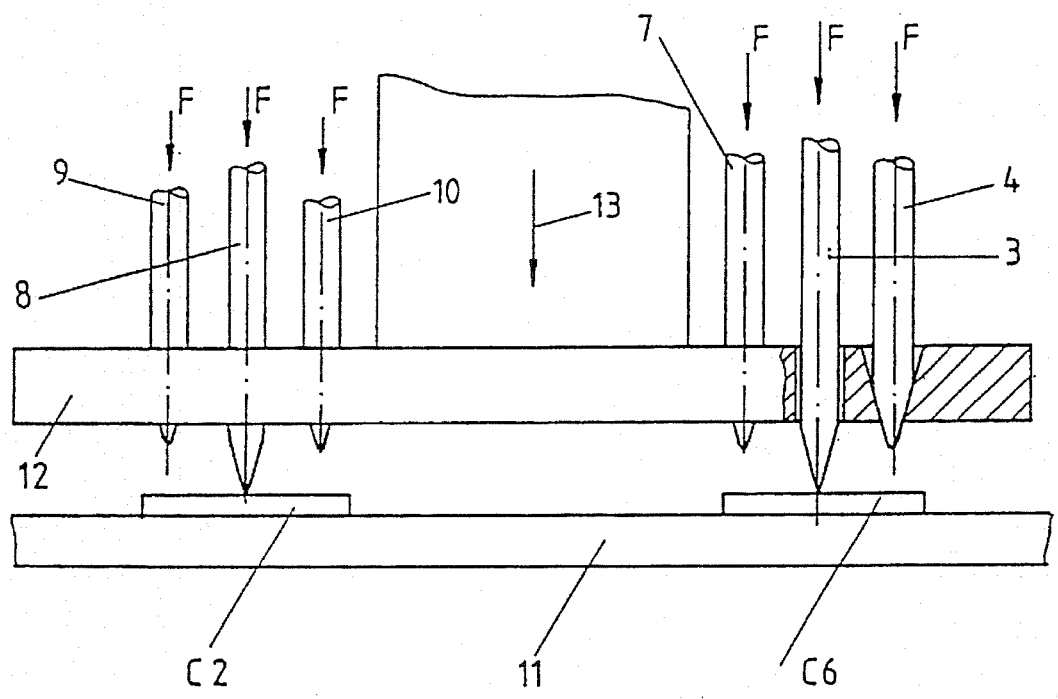
FIG. 3 shows a schematic cross section through a test head acting upon contact surfaces C2 and C6.

The test head shown schematically in FIG. 3 has a plate 12 made of an electrically insulating material in which springy contact pins 3 to 10 are guided. When a contact surface bank according to ISO 7816/2 is tested the contact pins can be disposed in such a way that contact pins 3 to 7 act upon contact bank C6, and contact pins 8 to 10 upon contact bank C2 (FIG. 2a).

Plate 12 of the test head is affixed to a lifting part 13 with which the entire test head can be moved toward the contact bank to be tested or removed therefrom. The spring mount of the contact pins that elastically prestresses them with force F is not shown, but the expert knows a number of possibilities for designing such a mount. The actual measuring circuit of the apparatus is not shown either; what is measured is the current flowing between center contact 3 or 8 and edge contacts 5, 6, 7 or 9 and 10. such measuring circuits are familiar to the expert and are therefore not shown separately.

If test currents flow between contact pairs 3–4, 3–5, 3–6 and 3–7 after contacting has been performed, all four circuits are closed and the position of contact C6 is correct.

In some cases it suffices to measure only contact C6, i.e. if the actual sizes of contact C6 are smaller than or equal to the actual size of all other contacts, if the contact center clearances still deviate only insignificantly from the theoretical value, if the angular deviation of the contact plan axes from the theoretical axes is small and, finally, if the distance between contact pins 7 and 4 or 5 and 6 is greater than the tolerance window defined by the ISO standard by an amount such that the differences nevertheless occurring necessarily with respect to the contact center clearances and the angular deviation of the contact plan axes are compensated thereby. These conditions are frequently ensured by producing or etching all contacts in one operation.

It is safer, however, to additionally test the position of contact C2 by contact pins 8–9 and 8–10. Furthermore, other combinations of contact pins up to four pins per contact are possible (cf. the configurations shown in FIGS. 2b, 2c and 2d). By accordingly analyzing the test results one can test any contact layouts as to their agreement with the tolerance zones defined by the standard.

If only one, or a small number of, contact surfaces are to be tested it has proven advantageous to use contact C6 for a test first, since this contact is no longer connected with the chip in new semiconductor chips since the programming voltage of 25 volts is generated via the operating voltage of 5 volts (C1).

All the configurations shown in FIGS. 1 and 2 constitute an ideal case in which the contact surface is disposed exactly centrically above the predetermined minimum contact surface plan. In reality this situation will rarely occur. With the dimensions of the standardized contact bank and actually used contact surface size given in FIG. 1 for bank C5, one has a positioning tolerance of +−0.3 mm in the X direction and +−0.25 mm in the Y direction.

The described test head is preferably used in a punching means for punching mini chip cards.

Figure 5:
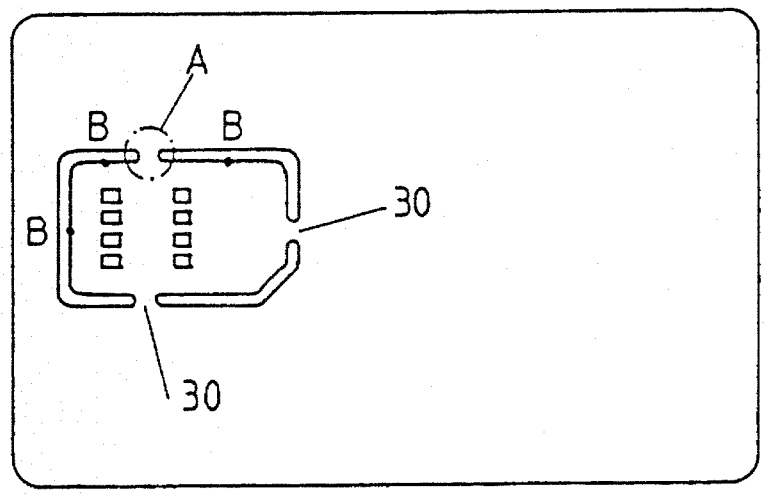
FIG. 5 shows a front view of a standard card having a prepunched mini chip card.

A binding international standard for these mini chip cards does not yet exist at present, but the mini chip card whose contours are shown in FIG. 5 is dimensioned in accordance with the international standard ISO 7816/2. This means that three reference points B on the outer edges of the card must be spaced a certain distance from the contact surface bank. Therefore, the second punching of a prepunched standard card leads to intolerable deviations if the prepunched card is positioned by stop means cooperating with its outer edges.

Figures 4A, 4B:
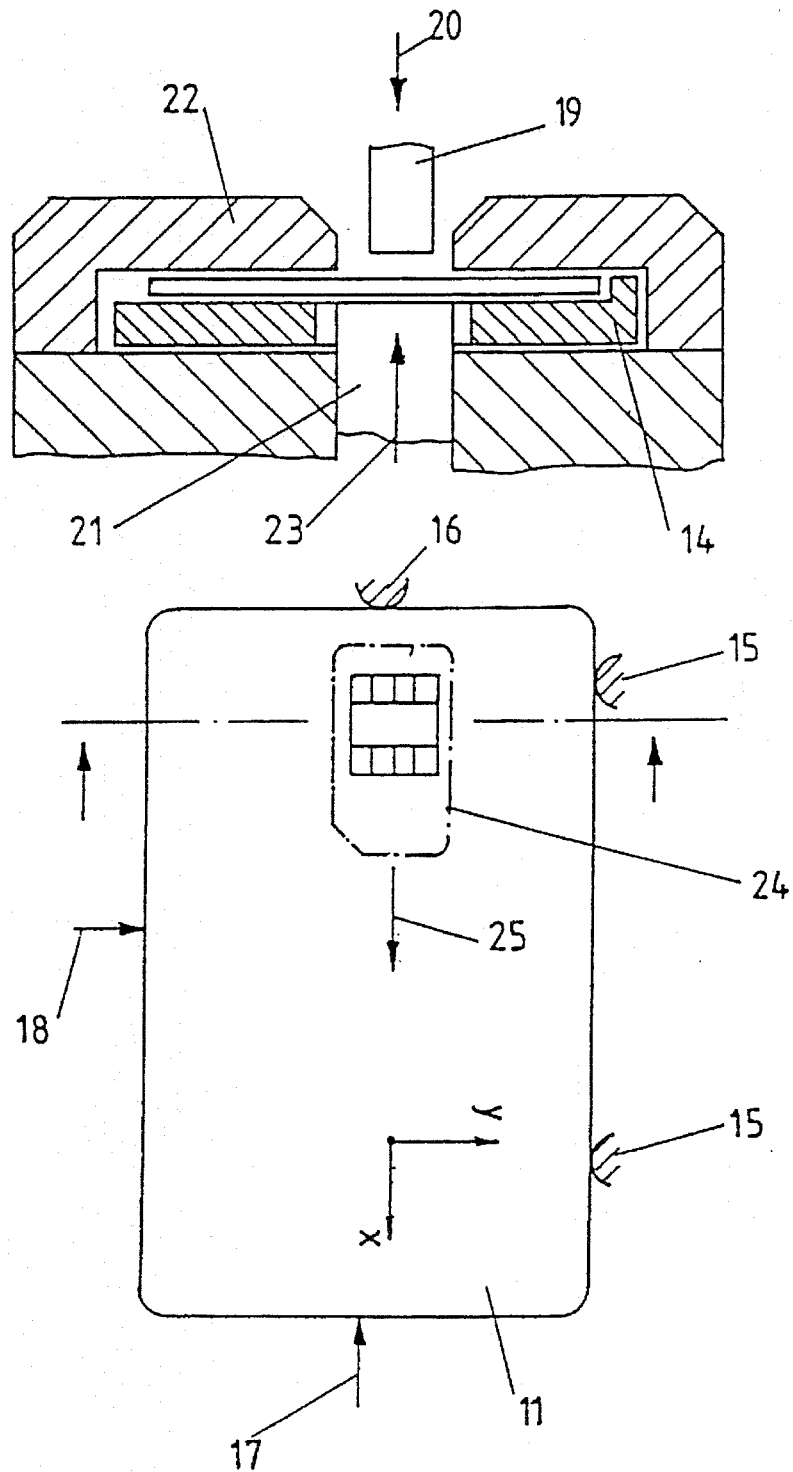
FIGS. 4a and 4b show a cross section through a punching means and a front view of a card fixed in the punching means.

However, it is possible to position the standard card with the test head first in such a way that the contact surface plan matches the tolerance window of the ISO standard. For this purpose card 11 (FIG. 4b) is positioned in a slide by stop means 14, 15 and 16. Slide 14 is displaceable in the X and Y directions, for example by motor operators, and is adjusted until the contact plan shown (in the ideal case) in FIGS. 1 and 2 results, i.e. until all associated pairs of contact pins display a current flow. In this position, slide 14 with the card clamped thereto is fixed, test head 19 is removed from the punching means and a stamping punch 23 moves through slide 14 against card 11 and punches, in cooperation with die-plate 22, the mini chip card out of the standard card in the correct position. Mini chip card 24 can be removed in the direction of arrow 25, whereupon stamping punch 23 moves back again and card 11 can be removed from the apparatus (FIG. 4a).

Figure 6:
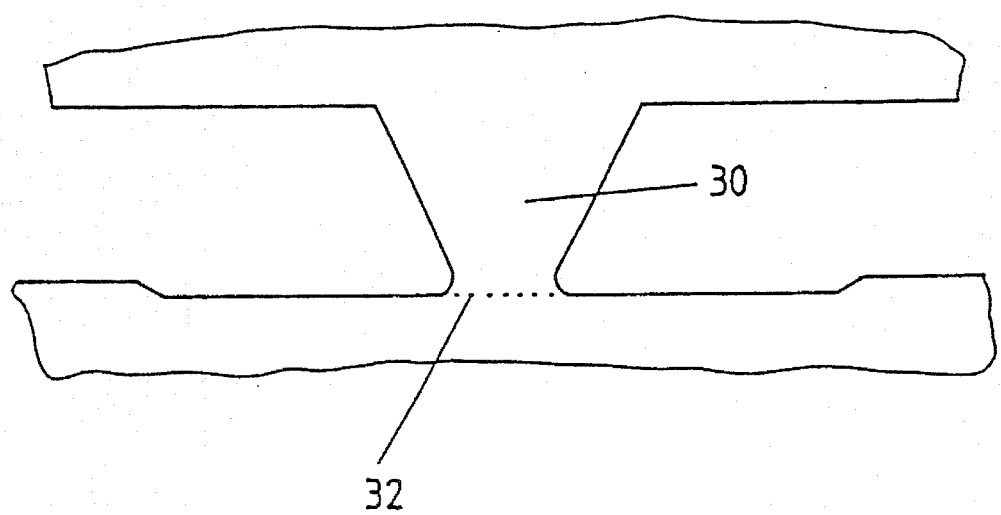
FIG. 6 shows the detail referred to as A in FIG. 5.

It is not absolutely necessary to punch the mini chip card out completely; it is instead useful not to punch out bar areas 30, whereby these areas should be designed in such a way that they can be easily broken out or at least easily punched out. FIG. 6 shows a specially designed bar area 30 in an enlarged view. The predetermined breaking point is perforated with a laser beam along a seam 32 so that it is easy to break the bar without any left-over bar areas falsifying the outer contour of the mini chip card.

Figure 7:
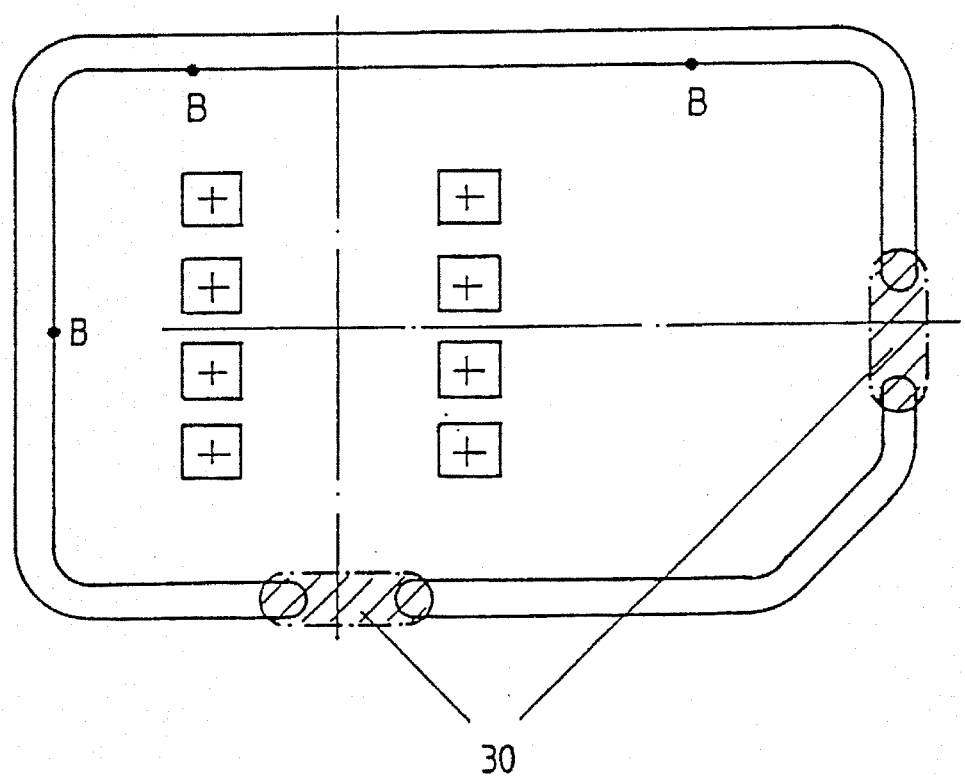
FIG. 7 shows a prepunched mini chip card with shaded bar areas.

However, the mini chip card can also be punched out as in FIG. 7 by punching out shaded areas 30. A concave indentation of the outer edge of the mini chip card at the place where the bars used to be has no effect on the correct position of reference points B relative to the contact surfaces.

Bar areas 30 connecting the mini chip card with the standard card can be punched out or severed at any time, preferably when it becomes clear whether the customer needs a standard card or a mini chip card. The mini chip card can be loaded with the user group or personal data and inscribed and all other production operations performed before the mini chip card is definitively separated from the standard card, using any means and devices developed for standard cards up to now.

I claim:

1. A method for producing a mini chip card from a standard card, said standard card having outer edges and having an embedded semiconductor chip with contact surfaces, said contact surfaces being located in agreement with a tolerance window defined by a standard and within a certain tolerance from the outer edges of the standard card, said method employing a punching die with cutting edges defining an outer contour of the mini chip card when produced from the standard card, said method comprising the steps of:

adjusting a position of the punching die relative to the standard card by positioning the die with respect to the contact surfaces so that the cutting edges of the punching die are at a predefined position with respect to the contact surfaces; and performing a punching operation with the punching die in the adjusted position to form the outer contour of the mini chip card, the contact surfaces being in a desired position with respect to the outer contour of the mini chip card formed by the punching operation so that the mini chip card is produced from the standard card with a desired positional relationship with respect to the contact surfaces.

2. The method of claim 1, characterized in that the position of the punching die is adjusted relative to the standard card by using a test head, which has a defined relationship with respect to the punching die, said test head having contact pins with tips, said method further comprising the steps of:

touching at least two points of at least one of the contact surfaces of the embedded semiconductor chip with contact pins of the test head, at least at one of the points being located in an edge area of the tolerance window;

applying a test voltage to the contact pins, in the course of which a current flow between the contact pins indicates that the tips of the contact pins are resting on the at least one contact surface and that the test head is in a correct position relative to the standard card, and thereafter adjusting the relative position of the punching die and performing the punching operation.

3. The method of claim 1, wherein the step of performing a punching operation is further defined in that the mini chip card remains connected with the standard card by thin, easily removable bars.

4. The method of claim 3 having a further step in which the bars are removed in such a way that the outer contour of the mini chip card formerly connected to the removed bars is substantially concave.

* * * * *